US008621163B2

(12) United States Patent
Hattori

(10) Patent No.: US 8,621,163 B2
(45) Date of Patent: Dec. 31, 2013

(54) MANAGEMENT APPARATUS FOR IMPROVED DATABASE REGISTRATION AND UPDATE

(75) Inventor: Masakazu Hattori, Kanagawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 143 days.

(21) Appl. No.: 13/411,763

(22) Filed: Mar. 5, 2012

(65) Prior Publication Data

US 2012/0226883 A1 Sep. 6, 2012

Related U.S. Application Data

(63) Continuation of application No. PCT/JP2009/066280, filed on Sep. 17, 2009.

(51) Int. Cl.
*G06F 12/12* (2006.01)

(52) U.S. Cl.
USPC ............................ 711/156; 711/154; 711/155

(58) Field of Classification Search
None
See application file for complete search history.

(56) References Cited

U.S. PATENT DOCUMENTS

| 5,761,710 | A | * | 6/1998 | Igami et al. .................. 711/123 |
| 7,266,669 | B2 | | 9/2007 | Matsui et al. |
| 7,975,220 | B2 | | 7/2011 | Hattori |
| 2003/0229650 | A1 | * | 12/2003 | Olstad et al. ................. 707/200 |
| 2006/0069885 | A1 | * | 3/2006 | Matsui et al. ................. 711/154 |
| 2007/0266197 | A1 | | 11/2007 | Neyama et al. |

FOREIGN PATENT DOCUMENTS

| JP | 04-370847 | 12/1992 |
| JP | 2004-062869 | 2/2004 |
| JP | 2006-106868 | 4/2006 |
| JP | 2007-072975 | 3/2007 |

OTHER PUBLICATIONS

International Search Report for International Application No. PCT/JP2009/066280 mailed on Oct. 20, 2009.
International Search Report for International Patent Application No. PCT/JP2009/066280 mailed on Oct. 20, 2009.

\* cited by examiner

*Primary Examiner* — Than Nguyen
(74) *Attorney, Agent, or Firm* — Turocy & Watson, LLP

(57) ABSTRACT

According to an embodiment a management apparatus includes: a stream storage configured to store a stream constituted by a plurality of pages; a trace information storage configured to store trace information in each stream, a receiving unit configured to receive a request to write the pages constituting the stream; and a management unit. The management unit refers to the trace information; writes the page into the stream storage when the write rule indicates that the page is to be written in the stream storage; writes the page into the temporary storage when the write rule indicates that the page is to be written in the temporary storage; and writes the page that has been written in the temporary storage into the stream storage in units of extents at a predetermined timing.

5 Claims, 8 Drawing Sheets

FIG.11

| TIME | REQUEST | STREAM X | EXTENT N | PAGE I | OPERATION | WRITE RULE | |
|---|---|---|---|---|---|---|---|
| t10 | WRITE | STREAM A | EXTENT 10 | PAGE 0 | ⇒ | WRITE PAGE IN STREAM STORAGE | STREAM STORAGE | ⎫ |
| ... | | | | | | | |
| t20 | WRITE | STREAM A | EXTENT 10 | PAGE 1 | ⇒ | WRITE PAGE IN STREAM STORAGE | STREAM STORAGE | BATCH REGISTRATION |
| ... | | | | | | | |
| t30 | WRITE | STREAM A | EXTENT 10 | PAGE 2 | ⇒ | WRITE PAGE IN STREAM STORAGE | STREAM STORAGE | |
| ... | | | | | | | |
| t40 | WRITE | STREAM A | EXTENT 12 | PAGE 0 | ⇒ | APPEND PAGE TO TEMPORARY STORAGE | TEMPORARY STORAGE | |
| ... | | | | | | | |
| t50 | WRITE | STREAM A | EXTENT 12 | PAGE 1 | ⇒ | APPEND PAGE TO TEMPORARY STORAGE | TEMPORARY STORAGE | |
| ... | | | | | | | |
| t60 | WRITE | STREAM A | EXTENT 12 | PAGE 2 | ⇒ | APPEND PAGE TO TEMPORARY STORAGE | TEMPORARY STORAGE | |
| ... | | | | | | | |
| t70 | WRITE | STREAM A | EXTENT 12 | PAGE 7 | ⇒ | APPEND PAGE TO TEMPORARY STORAGE | TEMPORARY STORAGE | ⎭ |
| ... | | | | | | | |
| t80 | WRITE | STREAM A | EXTENT 5 | PAGE 5 | ⇒ | MOVE EXTENT 12 TO STREAM STORAGE<br>APPEND PAGE 5 TO TEMPORARY STORAGE | TEMPORARY STORAGE | ⎫ RANDOM UPDATE |
| ... | | | | | | | |
| t90 | WRITE | STREAM A | EXTENT 8 | PAGE 3 | ⇒ | MOVE EXTENT 5 TO STREAM STORAGE<br>APPEND PAGE 3 TO TEMPORARY STORAGE | STREAM STORAGE | |
| ... | | | | | | | |
| t100 | WRITE | STREAM A | EXTENT 9 | PAGE 5 | ⇒ | WRITE PAGE IN STREAM STORAGE | STREAM STORAGE | ⎭ |
| ... | | | | | | | |

US 8,621,163 B2

MANAGEMENT APPARATUS FOR IMPROVED DATABASE REGISTRATION AND UPDATE

CROSS-REFERENCE TO RELATED APPLICATION

This application is a continuation of PCT international application Ser. No. PCT/JP2009/066280 filed on Sep. 17, 2009 which designates the United States; the entire contents of which are incorporated herein by reference.

FIELD

Embodiments described herein relate generally to a management apparatus.

BACKGROUND

Recently, a database management system is used in an embedded device such as a digital appliance, which includes a large-size storage. In the embedded device, although a capacity of main memory is increased, the capacity does not extend beyond several kilobytes to several megabytes, and it is necessary to perform processing within a restricted resource. Therefore, registration performance and update performance are not very high.

For example, disclosed is a technology relating to a DB file; a temporary write file in which update data is temporarily stored in units of pages; and shadow paging in which a map table is utilized to record a list of update pages in the temporary write file.

TECHNICAL PROBLEM

However, the above conventional technology is not suitable to an environment of a poor memory resource because a size of the map table is enlarged.

There is a need to provide a management apparatus that can improve the registration performance and the update performance in the environment of poor memory resource.

BRIEF DESCRIPTION OF THE DRAWINGS

FIG. 11 is an explanatory view illustrating a specific example of the write processing of the embodiment.

DETAILED DESCRIPTION

According to an embodiment, a management apparatus includes: a stream storage configured to store a stream constituted by a plurality of pages; a trace information storage configured to store trace information in each stream, a receiving unit configured to receive a request to write the pages constituting the stream; and a management unit. The management unit refers to the trace information; writes the page into the stream storage when the write rule indicates that the page is to be written in the stream storage; writes the page into the temporary storage when the write rule indicates that the page is to be written in the temporary storage; and writes the page that has been written in the temporary storage into the stream storage in units of extents at a predetermined timing.

Hereinafter, a management apparatus according to an embodiment will be described in detail with reference to the accompanying drawings. An example in which the management apparatus is incorporated in an embedded device such as a digital appliance is described in the embodiment.

Figure 1:
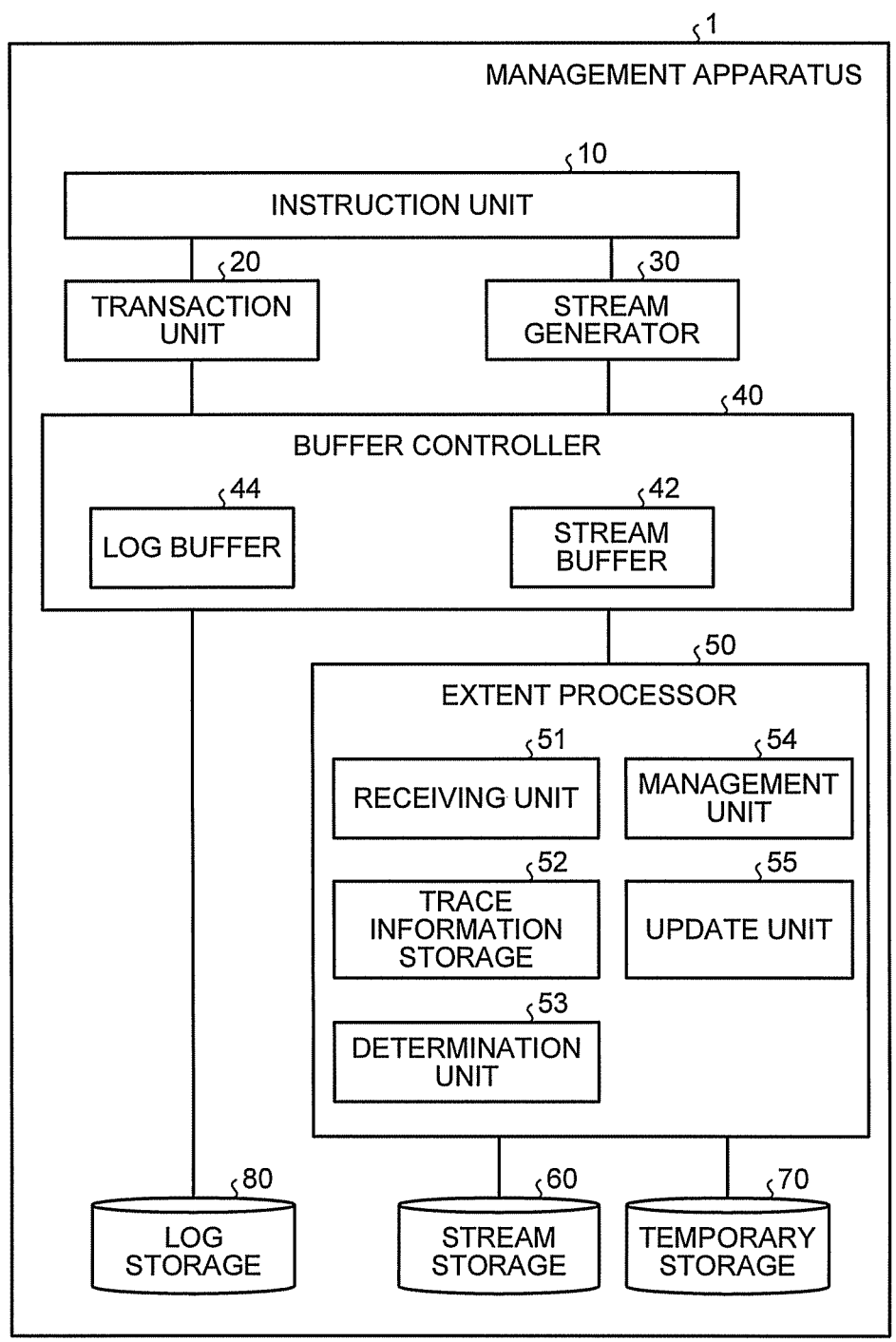
FIG. 1 is a view illustrating a configuration example of a management apparatus according to an embodiment.

FIG. 1 is a block diagram illustrating an example of a configuration: of a management apparatus 1 of the embodiment. As illustrated in FIG. 1, the management apparatus 1 includes an instruction unit 10, a transaction unit 20, a stream generator 30, a buffer controller 40, an extent processor 50, a stream storage 60, a temporary storage 70, and a log storage 80.

The instruction unit 10 receives a request to register stream data from an upper layer (not illustrated) to issue an instruction to the transaction unit 20 to start a transaction or an instruction to the stream generator 30 to register the stream data. When checking that the stream data has been normally registered, the instruction unit 10 issues an instruction to the transaction unit 20 to end the transaction.

As used herein, the transaction means an atomic operation performed to a database (such as the stream storage 60, the temporary storage 70, and the log storage 80 in the embodiment). The word of "atomic" means that the operation is indecomposable any more, and the operation means that data is written and read in and from the database. A characteristic called ACID (Atomicity, Consistency, Isolation, and Durability) is maintained in a database management system such as the management apparatus 1 of the embodiment.

The stream data means a data string in which a time series is maintained between pieces of data, and a straight-line flow in which the pieces of data are generated is likened to a stream. For example, Japanese Patent Application Laid-open No. 2007-226452 discloses a stream-oriented database.

When the instruction unit 10 issues the instruction to the transaction unit 20 to start the transaction, the transaction unit 20 makes a request to the buffer controller 40 to write a start log indicating a start of the transaction. When the instruction unit 10 issues the instruction to the transaction unit 20 to end the transaction, the transaction unit 20 makes a request to the buffer controller 40 to write an end log indicating an end of the transaction.

When the instruction unit 10 issues the instruction to the stream generator 30 to register the stream data, the stream generator 30 analyzes the stream data to generate plural main streams and sub-streams such as a data stream and an index stream.

Figure 2:
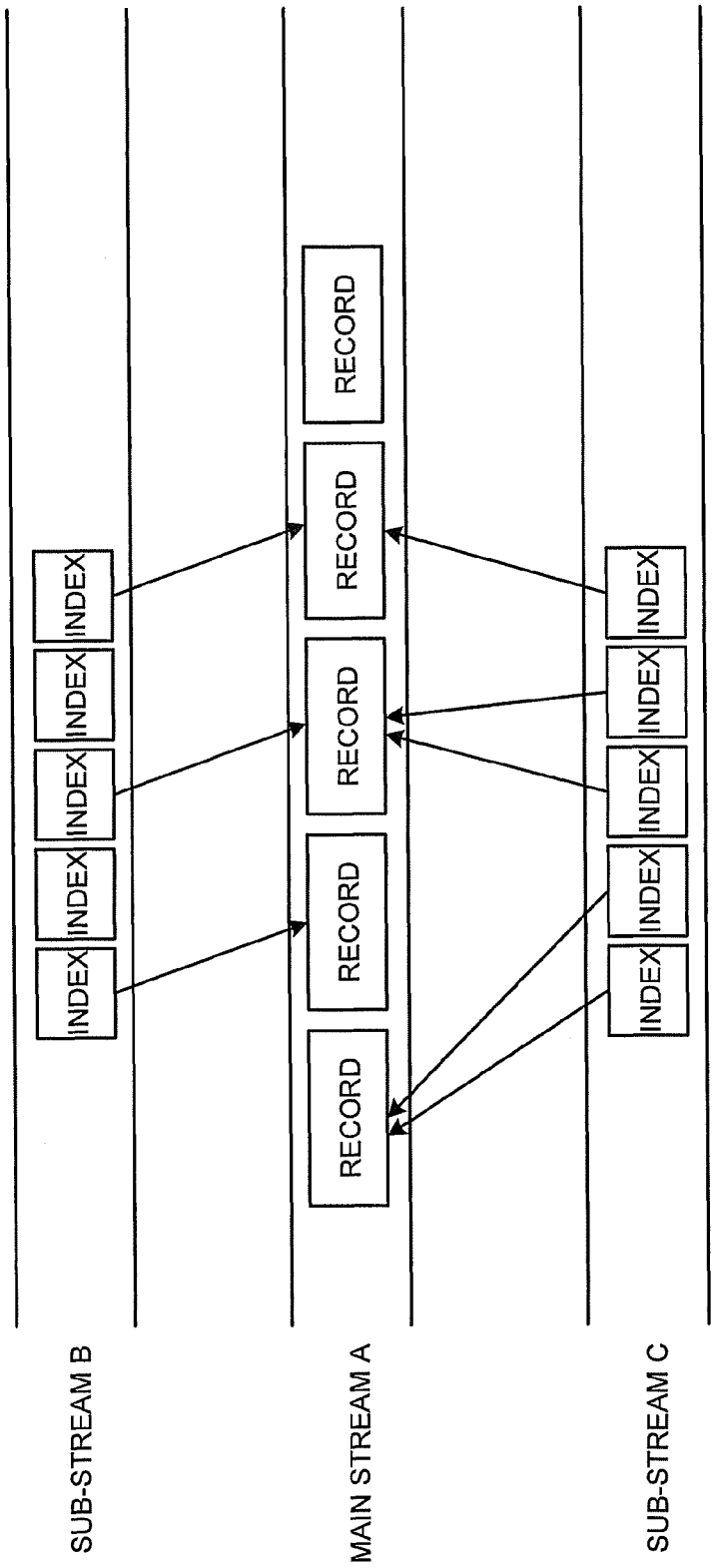
FIG. 2 is a view illustrating logical configuration examples of a main stream and sub-streams.

FIG. 2 is a view illustrating logical configuration examples of the main stream and the sub-streams, which are generated by the stream generator 30. In the example of FIG. 2, a main stream A is the data stream including a record that is of real data. The record means a series of pieces of data having a certain mass, and the record is constructed by pieces of column data that is of basic data. For example, in a case that the management apparatus 1 is applied to a digital television set, the record corresponds to program information, and the column data corresponds to a broadcast date and a broadcasting station, which are of a constituent element of the program information.

Sub-streams B and C are the index streams, and include a word index and a numerical value index, which are generated from the column data. The index included in one of the sub-streams B and C includes an ID of one of the records included in the main stream A. Therefore, the record and the index are linked to each other. A context of the indexes included in the sub-streams B and C is identical to a context of the records to which the indexes are linked. That is, as illustrated in FIG. 2, arrows each of which indicates the link between the record and the index do not intersect each other.

Figure 3:
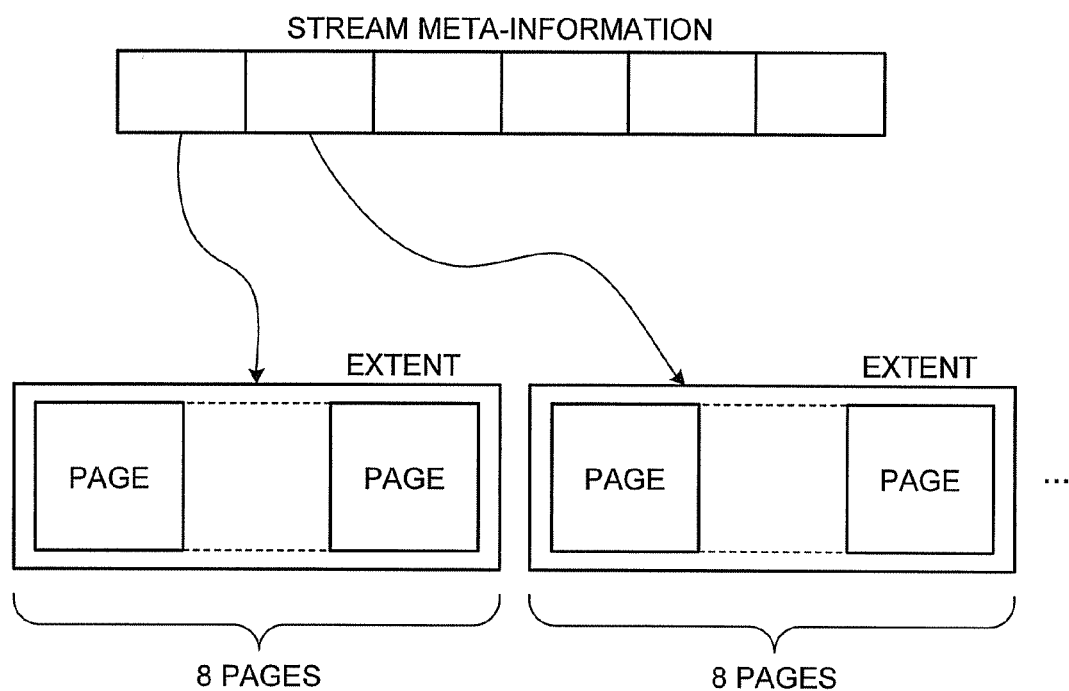
FIG. 3 is a view illustrating physical configuration examples of the main stream and the sub-streams.

FIG. 3 is a view illustrating physical configuration examples of the main stream and sub-streams, which are generated by the stream generator 30. As illustrated in FIG. 3, in the embodiment, the stream provides a link to plural extents while stream meta-information is used as a root. The extent means a series of physically continuous pages. In the embodiment, the number of continuous pages of the extent is 8 pages, and a size of each page is 4 KB.

Figure 4:
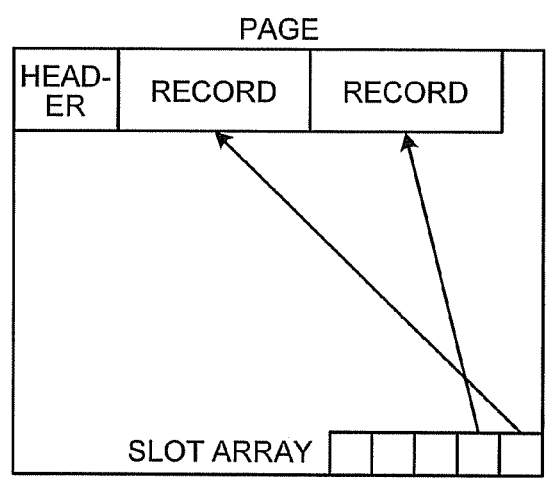
FIG. 4 is a view illustrating an example of a page.

FIG. 4 is a view illustrating an example of the page in the extent. As illustrated in FIG. 4, the pieces of data such as the record are stored in the page. The page has a data structure provided with a slot in preparation for data having a variable length.

Referring to FIG. 3, the stream generator 30 prepares one extent with respect to each of all the streams when producing the database. The stream generator 30 sequentially stores the pieces of data from a leading page of the extent. The stream generator 30 stores the long data exceeding a page size while the data straddles the plural pages. When storing the pieces of data in all the pages, the stream generator 30 prepares a new extent to repeatedly store the pieces of data in the page.

In the embodiment, because the page is arranged in units of extents, the continuous pages can be collected, and the size of metadata used to store the individual page can be reduced. Plural pieces of I/O processing performed to a hard disk can efficiently be bundled together in a group by grouping the pages.

Figure 5:
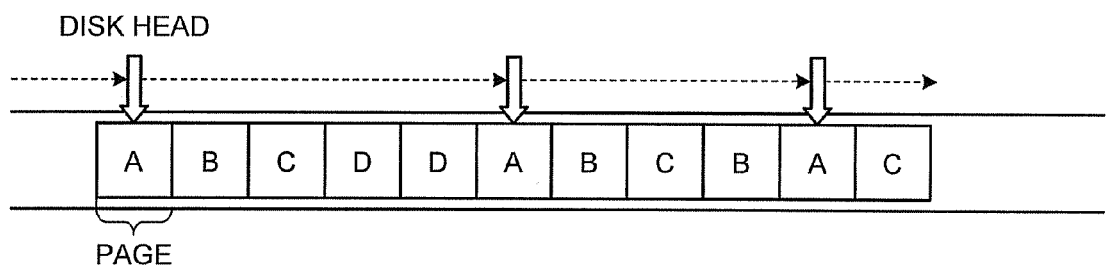
FIG. 5 is a view illustrating a page read example when the page is not arranged by an extent.
Figure 6:
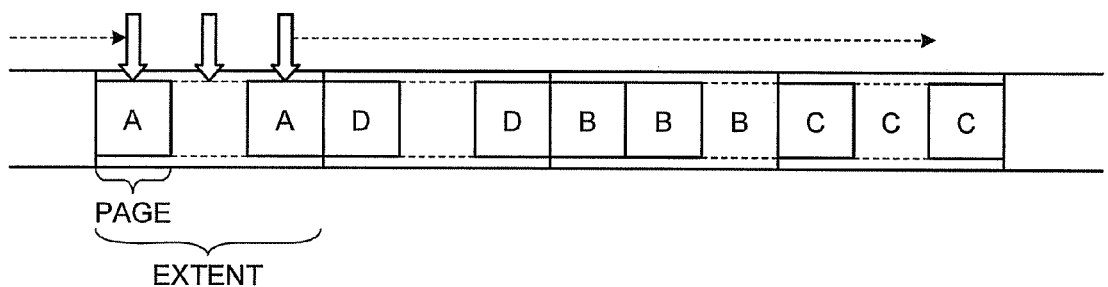
FIG. 6 is a view illustrating a page read example when the page is arranged by the extent.

For example, as illustrated in FIG. 5, in a case that the pages are not arranged in units of extents, a large movement amount of a disk head of the hard disk is required to read pages of a stream A, and it takes some time to read the pages. On the other hand, as illustrated in FIG. 6, in a case that the pages are arranged in units of extents, a small movement amount of the disk head is required to read pages of the stream A, and a time necessary to read the pages can be shortened.

Figure 7:
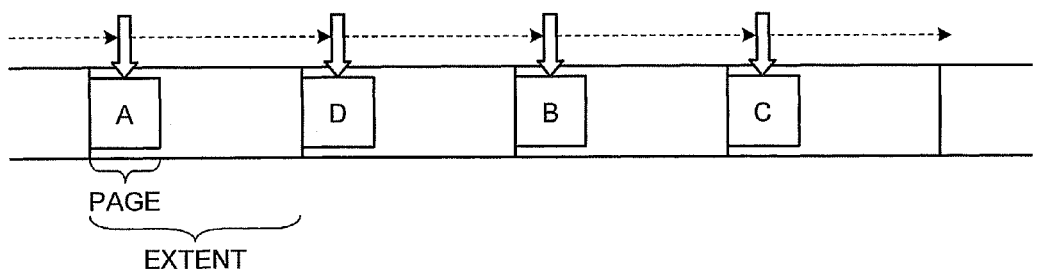
FIG. 7 is a view illustrating a page write example when the page is arranged by the extent.

However, in registering the data, it is necessary to register the data in each stream. Therefore, as illustrated in FIG. 7 in a case that the pages are arranged in units of extents, the large movement amount of the disk head is required, and it takes a long time to write the pages.

When the pages are arranged in units of extents, a speed of the search (read) is enhanced because the pages are physically continued, while a speed of the registration (write) is decreased because the necessity to randomly write the pages is generated. When the buffer controller 40, described later, prepares a buffer having a size in which the extents for the streams can be stored, a registration speed can be improved because the pages can be written in units of extents. However, that technique cannot be adopted in an environment of a poor memory resource like the management apparatus 1 of the embodiment.

Therefore, in the embodiment, as described later, the pages are appended to the temporary storage 70 and moved to the stream storage 60 in units of extents in predetermined timing. Therefore, even in the small memory environment, the registration speed and a batch update speed can be enhanced while continuity of a block in the extent is retained to maintain a search speed.

Referring to FIG. 1, the stream generator 30 makes a request to the buffer controller 40 to write the generated main streams and sub-streams in units of pages.

The stream generator 30 also makes a request to the buffer controller 40 to write a log that is of a series of operation contents relating to the registration of the stream data. The stream generator 30 also makes a request to a lock management unit (not illustrated) to perform lock securement and lock release for the purpose of concurrent control.

The buffer controller 40 includes a stream buffer 42 in which the pages of the main streams and sub-streams generated by the stream generator 30 are temporarily stored and a log buffer 44 in which the log produced by the stream generator 30 is temporarily stored. The buffer controller 40 controls the stream buffer 42 and the log buffer 44. For example, while coordinating the stream buffer 42 and the log buffer 44 in conformity to a WAL protocol, the buffer controller 40 makes a request to the extent processor 50 to write the main streams and the sub-streams in the stream storage 60, or writes the log in the log storage 80. The stream buffer 42 or the log buffer 44 can be constructed by volatile memory such as DRAM (Dynamic Random Access Memory).

Because the logs are sequentially produced by the stream generator 30 during the performance of the transaction, the buffer controller 40 appends the logs to the log buffer 44 in series. When the log buffer 44 is substantially filled up with the logs, the logs are forcedly written in the log storage 80.

When the new page is read on the stream buffer 42 while the stream buffer 42 is substantially filled up with the pages, the buffer controller 40 clears out the pages from the stream buffer 42 to make a request to the extent processor 50 to write the cleared pages. A technique such as LRU (Least Recently Used) and MRU (Most Recently Used) can be used to clear out the pages.

The buffer controller 40 performs WAL (Write Ahead Logging). The WAL means a protocol that is used to synchronize the stream buffer 42 with the log buffer 44. In the embodiment, update contents are written in the log storage 80 before written in the stream storage 60. When the WAL is guaranteed, a fault can be recovered by a combination of the WAL and checkpoint processing (flush processing performed to the stream storage 60).

The buffer controller 40 writes the page in the stream buffer 42 after writing the log in the log buffer 44, thereby coordinately operating the stream buffer 42 and the log buffer 44. The page written in the stream buffer 42 is randomly written in the stream storage 60, and the log written in the log buffer 44 is appended to the log storage 80. Usually, only the log can be appended to the log storage 80 while the page is stored in the stream buffer 42 because the registration and the update have locality, and the registration performance and the update performance are improved because appending the log is performed at high speed.

The buffer controller 40 uses a 2PL (Two-Phase Locking) protocol because of the concurrent control. The data is referred to by the transaction, locking is ensured during the update, and the locking retained by the transaction is completely released when commit processing or rollback of the transaction is ended.

The extent processor 50 includes a receiving unit 51, a trace information storage 52, a determination unit 53, a management unit 54, and an update unit 55.

The receiving unit 51 receives the request to write the pages constituting the stream from the buffer controller 40.

Figure 8:
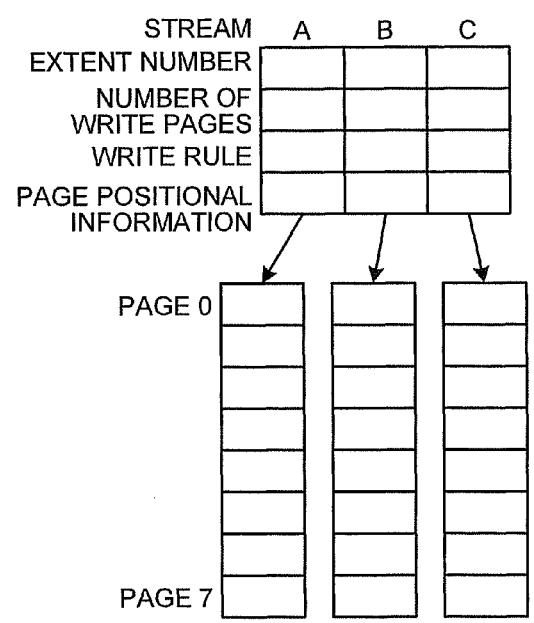
FIG. 8 is a view illustrating an example of trace information.

The extent that is of a set of continuous pages, the number of write pages that are already written in the pages belonging to the extent, a write rule, trace information with which page positional information is correlated are stored in the trace information storage 52 in each stream. FIG. 8 is a view illustrating an example of the trace information stored in the trace information storage 52. In the example of FIG. 8, an extent number indicating the extent, the number of write pages, the write rule, and the trace information with which the page positional information on 8 pages belonging to the extent are stored in each of the streams A to C. The update of the page belonging to the extent is stored in the page positional information, and the page positional information indicates in which the temporary storage 70 and the stream storage 60 the corresponding page is written.

In the case that the extent to which the page of which the write request is received belongs is not matched with the extent of the trace information, the determination unit 53 determines whether the number of write pages or a ratio of the number of write pages to the total number of pages belonging to the extent exceeds a threshold. When the number of write pages or the ratio exceeds the threshold, the determination unit 53 determines that the write of the page in the temporary storage 70 is used as the write rule of the extent to which the page of which the write request is received belongs. When the number of write pages or the ratio does not exceed the threshold, the determination unit 53 determines that the write of the page in the stream storage 60 is used as the write rule of the extent to which the page of which the write request is received belongs.

The management unit 54 refers to the trace information on the stream to which the page of which the write request is received belongs, writes the page in the stream storage 60 when the write rule corresponding to the extent to which the page belongs indicates that the page is written in the stream storage 60; or writes the page in the temporary storage 70 when the write rule corresponding to the extent to which the page belongs indicates that the page is written in the temporary storage 70, and writes the pages written in the temporary storage 70 in the stream storage 60 in units of extents in predetermined timing.

Specifically, the management unit 54 refers to the trace information on the stream to which the page of which the write request is received belongs, and writes the plural pages written in the temporary storage 70 into the stream storage 60 in units of extents when the extent to which the page belongs is not matched with the extent of the trace information.

When the page is written in the temporary storage 70, the management unit 54 appends the page to a bottom of the temporary storage 70. When the page is written in the stream storage 60, the management unit 54 calculates an offset on the stream storage 60 from an extent number and a page number, and writes the page at a calculated position.

The update unit 55 updates the extent of the trace information on the stream to which the page of which the write request is received belongs to the extent to which the page of which the write request is received belongs, updates the write rule of the trace information to the write rule determined by the determination unit 53, and initializes the number of write pages.

The update unit 55 increments the number of write pages of the trace information on the stream to which the page of which the write request is received belongs, when the page is written in the stream storage 60 or the temporary storage 70.

The stream including the plural pages is stored in the stream storage 60, and the stream storage 60 acts as a database in the embodiment. For example, the stream storage 60 can be constructed by an HDD (Hard Disk Drive) or an SSD (Solid State Drive).

The pages written in the stream storage 60 are temporarily stored in the temporary storage 70. For example, the temporary storage 70 can be constructed by the HDD (Hard Disk Drive), the SSD (Solid State Drive), a memory card, and an optical disk. A part of the stream storage 60 or log storage 80 may be used as the temporary storage 70.

The log is stored in the log storage 80, and the log storage 80 acts as a database in the embodiment. For example, the log storage 80 can be constructed by the HDD (Hard Disk Drive) or the SSD (Solid State Drive).

Figure 9:
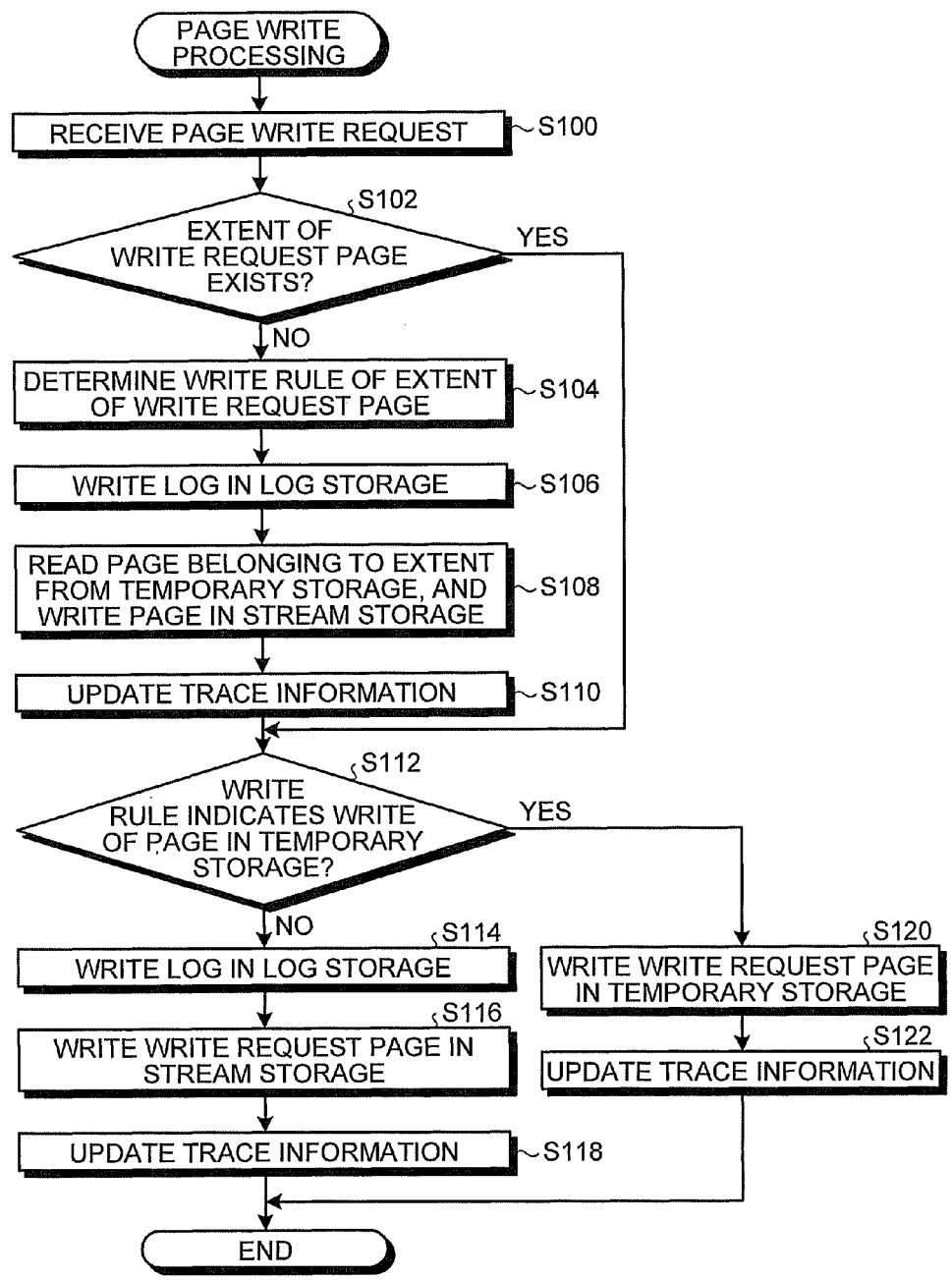
FIG. 9 is a flowchart illustrating a write processing example of the embodiment.

FIG. 9 is a flowchart illustrating an example of a procedure of write processing performed by the extent processor 50 of the embodiment.

In Step S100, the receiving unit 51 receives the page write request from the buffer controller 40.

In Step S102, the management unit 54 refers the trace information on the stream to which the page of which the write request is made from the trace information storage 52 belongs, and determines whether the extent to which the page of which the write request is made belongs is registered. When the extent is not registered (No in Step S102), the flow goes to Step S104. When the extent is registered (Yes in Step S102), the flow goes to Step S112.

In Step S104, the determination unit 53 determines the write rule of the extent to which the page of which the write request is made belongs. For example, the determination unit 53 determines the write rule based on whether a value, in which the number of pages registered in the trace information on the stream to which the page of which the write request is made belongs is divided by a number of pages in the extent, is more than a threshold. This is because advantageously the pages are directly appended to the temporary storage 70 when the almost all the pages in the extent are written in the temporary storage 70. In the embodiment, the determination unit 53 determines that the write of the page in the temporary storage 70 is used as the write rule when the value is more than the threshold, and the determination unit 53 determines that the write of the page in the stream storage 60 is used as the write rule when the value is equal to or lower than the threshold.

In Step S106, the buffer controller 40 writes the log in the log storage 80 on the request from the management unit 54 (WAL flush)

In Step S108, the management unit 54 reads the pages belonging to the extent registered in the trace information on the stream to which the page of which the write request is made belongs from the temporary storage 70, writes the pages in the stream storage 60 in units of extents, and moves the extent.

In Step S110, the update unit 55 updates the trace information on the stream to which the page of which the write request is made belongs. Specifically, the update unit 55 updates the extent number of the trace information to the extent number of the extent to which the page of which the write request is made belongs, updates the number of pages to 0, updates the write rule to the write rule determined in Step S104, and updates the page positional information to an initial value (UNDEF).

In Step S112, the management unit 54 refers to the trace information on the stream to which the page of which the write request is made belongs, and checks whether the write rule indicates that the page is written in the temporary storage

70. When the write rule does not indicate that the page is written in the temporary storage 70 (No in Step S112), the flow goes to Step S114. When the write rule indicates that the page is written in the temporary storage 70 (Yes in Step S112), the flow goes to Step S120.

In Step S114, the buffer controller 40 writes the log in the log storage 80 on the request from the management unit 54 (WAL flush)

In Step S116, the management unit 54 writes the page of which the write request is made in the stream storage 60. Specifically, the management unit 54 writes the page of which the write request is made in the offset of the extent to which the page of which the write request is made belongs in the stream storage 60.

In Step S118, the update unit 55 updates the trace information on the stream to which the page of which the write request is made belongs. Specifically, the update unit 55 increments the number of pages, and sets the offset to the page positional information on the page written in the stream storage 60.

In Step S120, the management unit 54 writes the page of which the write request is made in the temporary storage 70.

In Step S122, the update unit 55 updates the trace information on the stream to which the page of which the write request is made belongs. Specifically, the update unit 55 increments the number of pages, and sets the offset to the page positional information on the page written in the stream storage 60.

Figure 10:
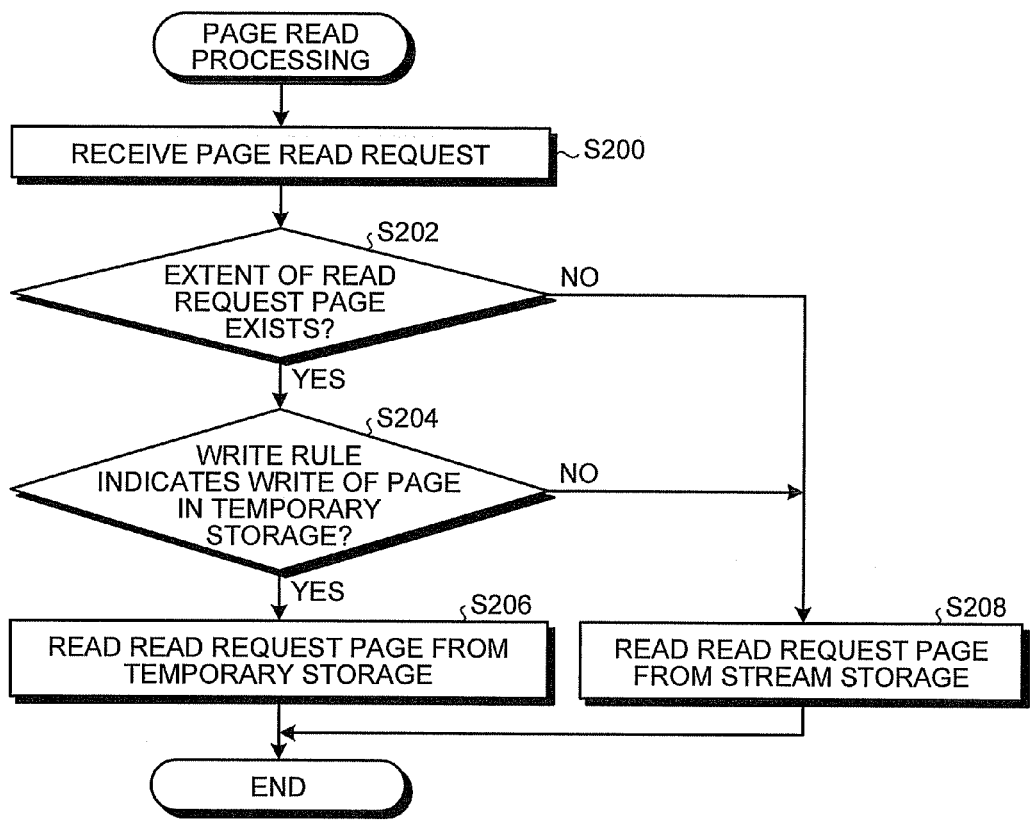
FIG. 10 is a flowchart illustrating a read processing example of the embodiment.

FIG. 10 is a flowchart illustrating an example of a procedure of read processing performed by the extent processor 50 of the embodiment.

In Step S200, the receiving unit 51 receives the page read request from the buffer controller 40.

In Step S202, the management unit 54 refers the trace information on the stream to which the page of which the read request is made from the trace information storage 52 belongs, and determines whether the extent to which the page of which the read request is made belongs is registered. When the extent is registered (Yes in Step S202), the flow goes to Step S204. When the extent is not registered (No in Step S202), the flow goes to Step S208.

In Step S204, the management unit 54 refers to the trace information on the stream to which the page of which the read request is made belongs, and checks whether the write rule indicates that the page is written in the temporary storage 70. When the write rule indicate that the page is written in the temporary storage 70 (Yes in Step S204), the flow goes to Step S206. When the write rule does not indicate that the page is written in the temporary storage 70 (No in Step S204), the flow goes to Step S208.

In Step S206, the management unit 54 reads the page of which the read request is made from the temporary storage 70.

In Step S208, the management unit 54 reads the page of which the read request is made from the stream storage 60.

FIG. 11 is a view for explaining a specific example of the write processing performed by the extent processor 50 of the embodiment. The example of FIG. 11 illustrates a transaction pattern in which the random update is generated after the butch registration of the stream is continuously performed. For the sake of simple description, the processing for writing only the stream A will be described below. It is assumed that the write rule at a time t10 indicates the write of the page in the stream storage 60.

At the time t10, the receiving unit 51 receives the page write request to write a page 0 belonging to an extent 10 from the buffer controller 40. At the time t10, because the write rule indicates that the page is written in the stream storage 60, the management unit 54 writes the page of which the write request is made in the offset of the page 0 belonging to the extent 10 in the stream storage 60. The update unit 55 increments the number of write pages of the extent 10.

At a time t20, the extent processor 50 performs the same processing as that at the time t10 to a page 1 belonging to the extent 10. At a time t30, the extent processor 50 performs the same processing as that at the time t10 to a page 2 belonging to the extent 10.

At a time t40, the receiving unit 51 receives the page write request to write a page 0 belonging to an extent 12 from the buffer controller 40. At the time t40, because the extent 12 is not registered in the trace information on the stream A but the extent 10 is registered, the determination unit 53 determines the write rule of the extent 12. Because the pages 0, 1, and 2 in the 8 pages of the extent 10 are written in the stream storage 60, the number of write pages becomes ⅜ with respect to the total number of pages of the extent. Assuming that the threshold is set to 0.3, because of ⅜>0.3, the determination unit 53 determines that the write of the page in the temporary storage 70 is used as the write rule of the extent 12, and the update unit 55 updates the write rule of the extent 12 to the temporary storage 70. The management unit 54 writes the page of which the write request is made in the temporary storage 70, and the update unit 55 increments the number of write pages of the extent 12.

At a time t50, the receiving unit 51 receives the page write request to write a page 1 belonging to the extent 12 from the buffer controller 40. At the time t50, because the write rule indicates that the page is written in the temporary storage 70, the management unit 54 appends the page of which the write request is made to the temporary storage 70. The update unit 55 increments the number of write pages of the extent 12.

At a time t60, the extent processor 50 performs the same processing as that at the time t50 to a page 2 belonging to the extent 12. At a time t70, the extent processor 50 performs the same processing as that at the time t50 to a page 7 belonging to the extent 12.

At a time t80, the receiving unit 51 receives the page write request to write a page 5 belonging to an extent 5 from the buffer controller 40. At the time t80, because the extent 5 is not registered in the trace information on the stream A but the extent 12 is registered, the determination unit 53 determines the write rule of the extent 5. At this point, because the pages 0, 1, 2, and 7 in the 8 pages of the extent 12 are written in the temporary storage 70, 4/8>0.3 is obtained, and the determination unit 53 determines that the write of the page in the temporary storage 70 is used as the write rule of the extent 5. The management unit 54 writes the pages 0, 1, 2, and 7 of the extent 12, which are written in the temporary storage 70, in the stream storage 60 in units of streams, and the update unit 55 updates the write rule of the extent 5 to the temporary storage 70. The management unit 54 writes the page of which the write request is made in the temporary storage 70, and the update unit 55 increments the number of write pages of the extent 5.

At a time t90, the receiving unit 51 receives the page write request to write a page 3 belonging to an extent 8 from the buffer controller 40. At the time t90, because the extent 8 is not registered in the trace information on the stream A but the extent 5 is registered, the determination unit 53 determines the write rule of the extent 8. At this point, because the page 5 in the 8 pages of the extent 5 is written in the temporary storage 70, ⅛<0.3 is obtained, and the determination unit 53 determines that the write of the page in the stream storage 60 is used as the write rule of the extent 5. The management unit 54 writes the page 5 of the extent 5, which is written in the temporary storage 70, in the stream storage 60 in units of streams, and the update unit 55 updates the write rule of the extent 8 to the stream storage 60. The management unit 54 writes the page of which the write request is made in the stream storage 60, and the update unit 55 increments the number of write pages of the extent 8.

At a time t100, the receiving unit 51 receives the page write request to write a page 5 belonging to an extent 9 from the buffer controller 40. At the time t100, because the extent 9 is not registered in the trace information on the stream A but the extent 8 is registered, the determination unit 53 determines the write rule of the extent 9. At this point, because the page 3 in the 8 pages of the extent 8 is written in the stream storage 60, $1/8<0.3$ is obtained, the determination unit 53 determines that the write of the page in the stream storage 60 is used as the write rule of the extent 9, and the update unit 55 updates the write rule of the extent 9 to the stream storage 60. The management unit 54 writes the page of which the write request is made in the stream storage 60, and the update unit 55 increments the number of write pages of the extent 9.

The transaction pattern, in which the data is randomly updated after the butch registration of the data is continuously performed to the time t70, is described in the example of FIG. 11. A write strategy of the next extent is determined while the trace relating to the page write is managed in units of extents, so that the optimum registration processing and update processing can be implemented while following (corresponding to) various transaction patterns.

As described above, in the embodiment, when the extent to which the page belongs is not matched with the extent of the trace information, the pages written in the temporary storage 70 are written in the stream storage 60 in units of extents. Therefore, even in the small memory environment, the registration speed and the batch update speed can be enhanced while the continuity of the block in the extent is retained to maintain the search speed.

The management apparatus of the embodiment includes a control device such as a CPU, a storage device such as ROM and RAM, an external storage device such as an HDD, a display device such as a display, and an input device such as a key switch, and the management apparatus has a hardware configuration in which a usual computer is used.

(Modifications)

The invention is not limited to the above embodiment, but various modifications can be made without departing from the scope of the invention. Various embodiments can be made by a proper combination of plural components disclosed in the embodiment. For example, some components may be removed from all the components illustrated in the embodiment. The components of different embodiments may properly be combined.

In the embodiment, the management apparatus is incorporated in the embedded device such as the digital appliance by way of example. Alternatively, the management apparatus may be applied to a client-server management system.

In the embodiment, by way of example, the write rule is determined based on whether the ratio of the number of write pages to the total number of pages belonging to the extent exceeds the threshold. Alternatively, the write rule may be determined based on whether the number of write pages exceeds a threshold.

According to at least one embodiment, the registration performance and the update performance can be improved in the environment of the poor memory resource.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management apparatus comprising:
a stream storage configured to store a stream constituted by a plurality of pages;
a trace information storage configured to store trace information in each stream,
an extent and a write rule being correlated in the trace information,
the extent being a set of continuous pages,
the write rule indicating which the stream storage or a temporary storage the pages are to be written in, and
the temporary storage temporary storing the pages to be written;
a receiving unit configured to receive a request to write the pages constituting the stream; and
a management unit configured to
refer to the trace information on the stream to which the page of which the write request is received belongs,
write the page into the stream storage when the write rule correlated with the extent to which the page belongs indicates that the page is to be written in the stream storage,
write the page into the temporary storage when the write, rule indicates that the page is to be written in the temporary storage, and
write the page that has been written in the temporary storage into the stream storage in units of extents at a predetermined timing.

2. The apparatus according to claim 1, wherein
the management unit
refers to the trace information on the stream to which the page of which the write request is received belongs, and
writes the plurality of pages that has been written in the temporary storage into the stream storage in units of extents when the extent to which the page belongs is not matched with an extent of the trace information.

3. The apparatus according to claim 2, wherein
the trace information storage further stores a number of write pages already written out of the pages belonging to the extent, correlated with the extent, and
the apparatus further comprises:
a determination unit configured to
determine whether the number of write pages or a ratio of the number of write pages to a total number of pages belonging to the extent exceeds a threshold when the extent to which the page belongs is not matched with the extent of the trace information,
determine that the write of the page into the temporary storage is set as the write rule of the extent to which the page of which the write request is received belongs, when the number of write pages, or the ratio of write pages to the total pages exceeds the threshold, and
determine that the write of the page into the stream storage is used as the write rule of the extent to which the page of which the write request is received belongs, when the number of write pages or the ratio does not exceed the threshold; and an update unit configured to
update the extent of the trace information on the stream to which the page of which the write request is received belongs to the extent to which the page of which the write request is received belongs,
update the write rule of the trace information to the write rule determined by the determination unit, and
initialize the number of write pages.

4. The apparatus according to claim 3, wherein
the update unit increments the number of write pages of the trace information on the stream to which the page of which the write request is received belongs, when the page is written into the stream storage or into the temporary storage.

5. The apparatus according to claim 1, further comprising:
a log buffer configured to store temporarily a log indicating a content of the page that is written into the stream storage and a content of the page that is written into the temporary storage; and
a buffer controller configured to write the log stored in the log buffer into a log storage when the page is written into the stream storage.

* * * * *